(12) United States Patent
Yamada et al.

(10) Patent No.: US 6,989,218 B2
(45) Date of Patent: Jan. 24, 2006

(54) COMPOSITE ELECTRODE MATERIAL AND METHOD FOR PRODUCING THE SAME, AND ELECTROCHEMICAL ELEMENT USING THE SAME

(75) Inventors: Masayuki Yamada, Yawara-mura (JP); Miwa Miyamoto, Yawara-mura (JP); Eri Yokoyama, Yawara-mura (JP); Toshihiro Koyama, Yawara-mura (JP); Shoji Saibara, Yawara-mura (JP); Shigeo Aoyama, Yawara-mura (JP)

(73) Assignee: Hitachi Maxell, Ltd., Osaka (JP)

( * ) Notice: Subject to any disclaimer, the term of this patent is extended or adjusted under 35 U.S.C. 154(b) by 358 days.

(21) Appl. No.: 10/275,035

(22) PCT Filed: Sep. 26, 2001

(86) PCT No.: PCT/JP01/08348

§ 371 (c)(1),
(2), (4) Date: Oct. 31, 2002

(87) PCT Pub. No.: WO02/27825

PCT Pub. Date: Apr. 4, 2002

(65) Prior Publication Data

US 2003/0142466 A1   Jul. 31, 2003

(30) Foreign Application Priority Data

Sep. 28, 2000  (JP)  ............................ 2000-296478
Aug. 23, 2001  (JP)  ............................ 2001-253239

(51) Int. Cl.
  *H04M 4/58* (2006.01)
  *H01M 4/62* (2006.01)
  *B05D 5/12* (2006.01)

(52) U.S. Cl. .............. 429/231.95; 429/232; 427/126.1; 204/192.15

(58) Field of Classification Search ........... 429/231.95, 429/232; 204/192.15; 427/126.1, 215, 255.21
See application file for complete search history.

(56) References Cited

U.S. PATENT DOCUMENTS

| 6,410,188 B1 * | 6/2002 | Shirane et al. .......... 429/231.95 |
| 6,503,657 B1 * | 1/2003 | Takami et al. ...... 429/231.95 X |
| 6,689,512 B2 * | 2/2004 | Kimura et al. ...... 429/231.95 X |
| 6,770,400 B2 * | 8/2004 | Tsutsumi et al. ....... 429/231.95 |

FOREIGN PATENT DOCUMENTS

| EP | 0 744 782 A1 | 11/1996 |
| EP | 0 752 728 A2 | 1/1997 |
| JP | 59-20971 | 2/1984 |

(Continued)

OTHER PUBLICATIONS

M. Nishijima et al.; "Synthesis and electrochemical studies of a new anode material, $Li_{3-x}Co_xN$," Solid State Ionics, vol. 83, pp. 107-111 (1990), (month unknown).

(Continued)

*Primary Examiner*—Stephen J. Kalafut
(74) *Attorney, Agent, or Firm*—Osha Liang LLP

(57) ABSTRACT

A material capable of occluding/discharging a lithium ion or a lithium-ion-conducting material is made to adhere to a surface of a particle of a lithium transition metal composite nitride having a particle diameter of 0.01 to 30 μm by a vapor phase method represented by a thin-film forming method selected from chemical vapor deposition, vapor deposition, ion plating and sputtering, thereby providing a composite electrode material with improved stability in the air as an electrode material capable of constituting an electrochemical element having a large capacity and improved cycle characteristics.

16 Claims, 2 Drawing Sheets

FOREIGN PATENT DOCUMENTS

| | | |
|---|---|---|
| JP | 9-102313 | 4/1997 |
| JP | 10-312793 | 11/1998 |
| JP | 11-3707 | 1/1999 |
| JP | 2000-67858 | 3/2000 |
| JP | 2000-173667 | 6/2000 |
| JP | 2001-15101 | 1/2001 |
| JP | 2001-206723 | 7/2001 |
| KR | 1998-059340 | 12/1996 |
| WO | WO 96/19003 | 6/1996 |

OTHER PUBLICATIONS

Patent Abstracts of Japan, Publication No. 59020971 A, Feb. 2, 1984, 1 pg.
Patent Abstracts of Japan, Publication No. 2001-206723, Jul. 31, 2001, 1 pg.
Patent Abstracts of Japan, Publication No. 2001-015101, Jan. 19, 2001, 1 pg.
Patent Abstracts of Japan, Publication No. 2000-173667, Jun. 23, 2000, 1 pg.
Patent Abstracts of Japan, Publication No. 11003707 A, Jan. 6, 1999, 1 pg.
Patent Abstracts of Japan, Publication No. 10312793 A, Nov. 24, 1998, 1 pg.
Patent Abstracts of Japan, Publication No. 09102313 A, Apr. 15, 1997, 1 pg.
Partial Translation of JP 2001-015101 A, with Verification of Translation, 3 pgs.
International Preliminary Examination Report dated Sep. 6, 2002, 5 pgs.
German Office Action dated Nov. 7, 2003 (3 pgs.).
Korean Patent Application Office Action dated Nov. 18, 2004 (2 pages).
Patent Abstracts of Japan; Publication No. 2000-067858 dated Mar. 3, 2000 (7 pages).

* cited by examiner

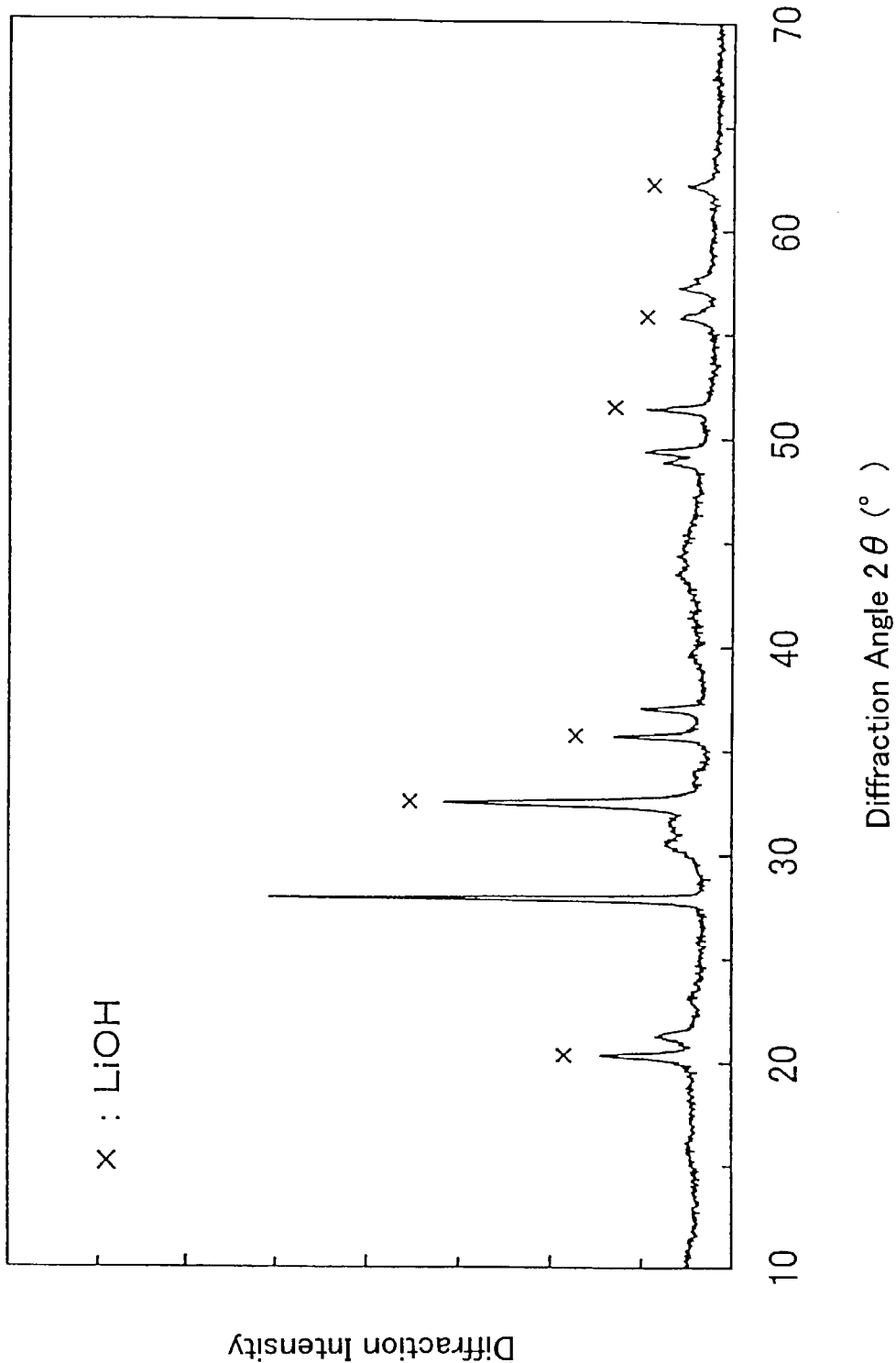

COMPOSITE ELECTRODE MATERIAL AND METHOD FOR PRODUCING THE SAME, AND ELECTROCHEMICAL ELEMENT USING THE SAME

TECHNICAL FIELD

The present invention relates to a composite electrode material that can be used for an electrochemical element such as a lithium secondary battery, a capacitor or the like and a method for manufacturing the same, and an electrochemical element in which such a composite electrode material is used for at least one of a positive electrode and a negative electrode.

BACKGROUND ART

Conventionally, as an active material for a negative electrode of an electrochemical element with a nonaqueous electrolyte, an electrode material such as a layered compound, for example, graphite in which lithium can be removably inserted, or a metal or metal oxide that can be alloyed with lithium has been used, for example, in the case of lithium secondary batteries. Graphite-based negative electrode material has excellent reversibility with respect to an electrochemical oxidation-reduction cycle. This is because only the occlusion or discharge of lithium between layers of the layered compound occurs during charging and discharging, so that the crystal structure of the electrode material itself does not change considerably. However, the above-mentioned graphite-based negative electrode material utilizes the back and forth movement of lithium between the layers, and thus, at most one lithium atom reacts with six carbon atoms. In theory, it is difficult to achieve a capacity of 372 mAh/g or more using such a method.

On the other hand, other negative electrode material that can be alloyed with lithium can achieve a large discharge capacity that exceeds 1000 mAh/g. One example is silicon where three or more lithium atoms react with one silicon atom. However, there is a problem that such electrode material particles have a high swelling/contracting rate with the alloying of lithium, which deteriorates their cycle characteristics.

Accordingly, as a negative electrode material that has excellent cycle characteristics and is capable of achieving a higher capacity, a lithium transition metal composite nitride has been developed. This composite is expressed by a general formula $Li_jM_kN_m$ wherein M is a transition metallic element, j>0, k>0, and m>0 (see M. Nishijima et. al., Solid State Ionics, vol. 83, 107(1996)). This electrode material is a layered compound similar to the graphite and exhibits an excellent reversibility with respect to an electrochemical oxidation-reduction cycle. Further, it also achieves a high capacity of 800 mAh/g or more, and has been attracting attention.

However, such a lithium transition metal composite nitride has the following problem. It is very unstable in the air, reacting with moisture therein, and decomposing into LiOH or $Li_2CO_3$ leading to loss of function as an electrode material. Therefore, when using this composite as an electrode material, it has to be dealt with in a dry room or the like, which may complicate the manufacturing process.

In relation to this, JP 2001-15101 A discloses a method of coating at least a part of a surface of such a lithium transition metal composite nitride with an electrically conductive material using a mechanofusion technique. However, this method attempts to give the lithium transition metal composite nitride an electrical conductivity and does not consider stability in the air.

According to the inventors' research, it was found that the above-described method using the mechanofusion technique cannot give the surface of the lithium transition metal composite nitride sufficient stability in the air because the surface tends to be coated ununiformly. Furthermore, when a thick coating is formed so as to give a certain stability in the air, the charge-discharge reaction of the lithium transition metal composite nitride is inhibited.

The present invention was made in order to solve the conventional problems described above, and an object of the present invention is to provide a composite electrode material with improved stability in the air as an electrode material capable of constituting an electrochemical element with increased capacity and improved cycle characteristics.

DISCLOSURE OF INVENTION

A composite electrode material in accordance with an embodiment of the present invention includes a particle of lithium transition metal composite nitride having a particle diameter of 0.01 to 30 µm, and a material capable of occluding/discharging a lithium ion or a lithium-ion-conducting material (except the lithium transition metal composite nitride), which is made to adhere to a surface of the particle of the lithium transition metal composite nitride by a vapor phase method.

In other words, in accordance with an embodiment of the present invention, a composite electrode material includes a particle of lithium transition metal composite nitride having the above-mentioned particle diameter, and a material capable of occluding/discharging a lithium ion or a lithium-ion-conducting material (except the lithium transition metal composite nitride), which is made to adhere to a surface of the particle of the lithium transition metal composite nitride by a vapor phase method, and a method for manufacturing the same.

In the vapor phase method, a use of a thin-film forming method such as chemical vapor deposition, vapor deposition, ion plating and sputtering is preferable.

By making this composite material adhere to a surface of a particle of a lithium transition metal composite nitride by a vapor phase method, it is possible to provide the surface of the particle with a uniform and thin coating and reduce the contact between the composite material and the moisture in the air reliably. Such a composite electrode material is stable in the air and easy to handle.

Furthermore, since the coating is a thin one, this coating does not inhibit a charge-discharge reaction easily, so that the reversibility of an electrochemical insertion or removal of lithium is not hindered.

Moreover, although the lithium transition metal composite nitride has a unique problem of having an initial charge capacity smaller than a discharge capacity because this compound originally contains lithium, such a problem can be lessened or alleviated by coating its surface with a material capable of occluding/discharging a lithium ion or a lithium-ion-conducting material. Thus, it is possible to achieve a composite electrode material having high-capacity characteristics similar to those of the lithium transition metal composite nitride.

Accordingly, by using the above-described composite electrode material for at least one of a positive electrode and a negative electrode, an electrochemical element of the present invention can be manufactured safely and easily and achieves a high capacity and improved cycle characteristics.

BRIEF DESCRIPTION OF DRAWINGS

FIG. 2 shows an X-ray diffraction profile of the electrode material of Comparative example 1 after one hour of exposure to the air.

BEST MODE FOR CARRYING OUT THE INVENTION

Figure 1:
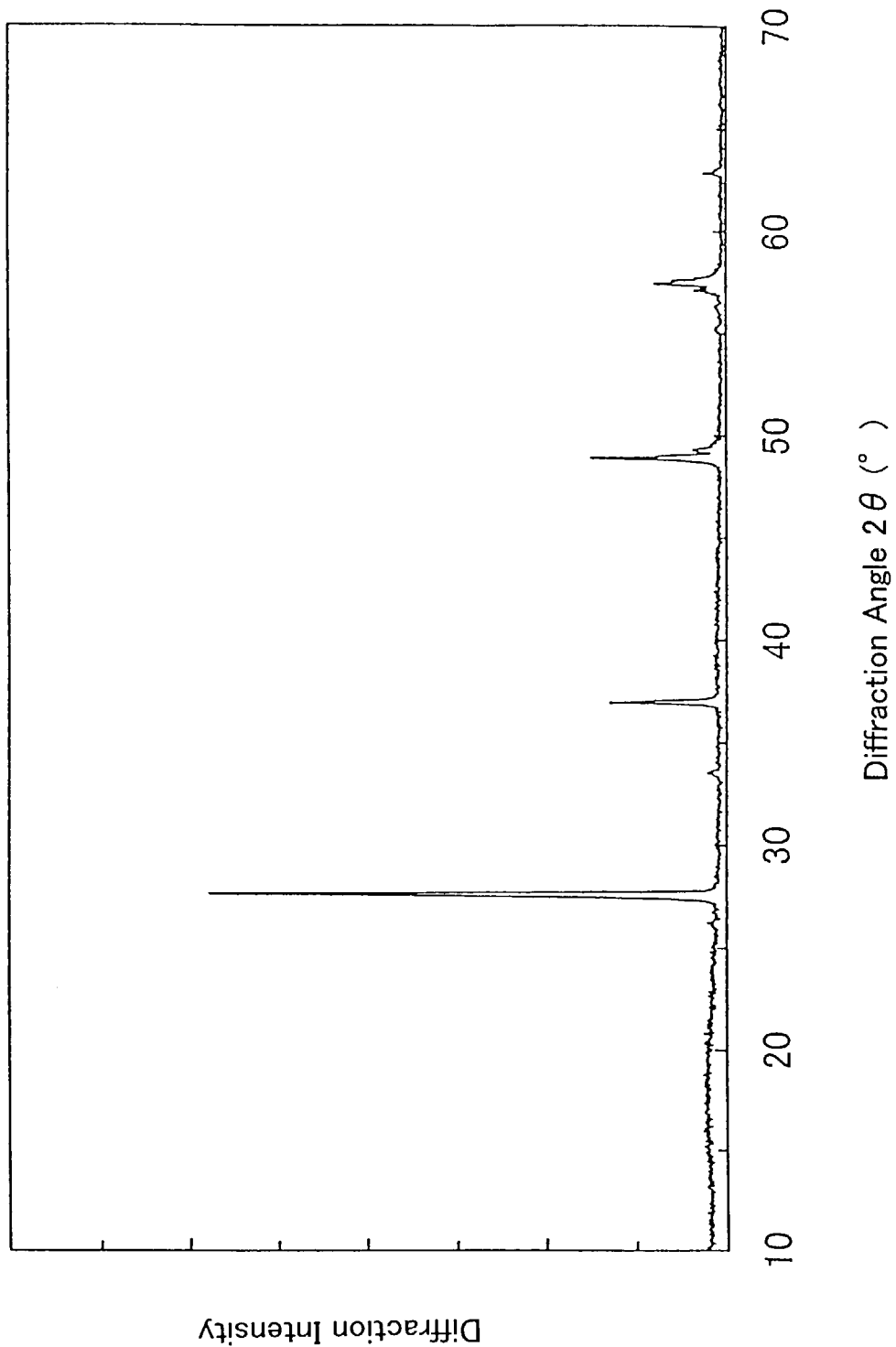
FIG. 1 shows an X-ray diffraction profile of an electrode material of Comparative example 1 prior to exposure to the air.

In a lithium transition metal composite nitride serving as a core of a composite electrode material of an embodiment of the present invention, it is preferable that a transition metallic element constituting the lithium transition metal composite nitride is at least one element selected from the group consisting of Co, Cu, Fe and Ni. This is because these elements can both maintain a structure of $Li_3N$ known as a solid electrolyte and constitute a compound suitable for an electrode material for an electrochemical element.

More specifically, the lithium transition metal composite nitride can be $Li_jCo_kN$, $Li_jCu_kN$, $Li_jFe_kN$, $Li_jNi_kN$, $Li_jCo_kNi_mN$ or $Li_jCo_kCu_mN$, for example. Generally, j, k and m satisfy $0<j<5$, $0<k<5$ and $0<m<5$, preferably $0<j<3$, $0<k<2$ and $0<m<2$, and most preferably $1<j<3$, $0<k<1$ and $0<m<1$. For example, $Li_{2.6}Co_{0.4}N$, $Li_{2.6}Cu_{0.4}N$, $Li_{2.6}Ni_{0.4}N$, $Li_{2.5}Co_{0.4}Ni_{0.1}N$ or $Li_{2.5}Co_{0.4}Cu_{0.1}N$ can be used preferably.

The lithium transition metal composite nitride can be obtained by mixing lithium and a chemical element of transition metal, an oxide, a nitride, a halide, a carbonate, an alkoxide, an organometallic complex or the like and burning the mixture in an atmosphere of an inert gas such as a nitrogen gas or that of a reducing gas prepared by mixing with a hydrogen gas at a temperature ranging from about 200° C. to 1000° C.

In an embodiment of the present invention, a particle of the lithium transition metal composite nitride has a particle diameter of 0.01 to 30 $\mu$m, more preferably 0.1 to 7 $\mu$m. In order to provide a thinner and more uniform coating of a material capable of occluding/discharging a lithium ion or a lithium-ion-conducting material (except the lithium transition metal composite nitride) on a surface of a particle of the lithium transition metal composite nitride by a vapor phase method, it is appropriate to set the particle diameter of the lithium transition metal composite nitride to be 30 $\mu$m or smaller, and it is more preferable to set it to be 7 $\mu$m or smaller. However, when the particle diameter is set to be smaller than 0.01 $\mu$m, the surface area increases excessively, which raises reactivity with moisture. Accordingly, it is preferred to set the particle diameter to be 0.01 $\mu$m or larger, and it is more preferable to set it to be 0.1 $\mu$m or larger.

Also, in the composite electrode material in accordance with an embodiment of the present invention, the material capable of occluding/discharging the lithium ion can be carbon metal, semimetal, semiconductor or an oxide or nitride of an element constituting a carbon metal, semimetal, or semiconductor. More specifically, carbon is preferable, an element, an oxide or a nitride of at least one selected from the group consisting of Mg, Ca, Al, Si, Ge, Sn, Sb, Bi, Ga, In, and Zn is preferable, and an oxide or a nitride of at least one selected from the group consisting of Ti, V, Cr, Mn, Fe, Co, Ni, Cu, Nb and Mo is preferable. These materials are preferable due to their ability to occlude/discharge many lithium ions. Also, carbon has a high electron-conducting property, making it possible to achieve a composite electrode material in which the capacity does not decrease considerably even at the time of discharging a large current.

Furthermore, as the lithium-ion-conducting material, a solid electrolyte can be used, and at least one selected from the group consisting of $Li_3PO_4$, $Li_4SiO_4$ and $xLi_3PO_4$-$(1-x)Li_4SiO_4$ ($0<x<1$), which has an excellent lithium ion conductivity and less tendency to inhibit a charge-discharge reaction, is preferable.

The thickness of the material capable of occluding/discharging a lithium ion or the lithium-ion-conducting material to be made to adhere to the surface of the particle of a lithium transition metal composite nitride preferably is 1 nm to 2 $\mu$m, and more preferably is 10 nm to 0.5 $\mu$m. In other words, it is appropriate for the purpose of inhibiting the reaction with the moisture in the air to set the coating to have a certain thickness, while it is appropriate for not inhibiting the charge-discharge reaction of the lithium transition metal composite nitride to satisfy the above-mentioned range.

Also, as a vapor phase method used for obtaining a composite electrode material of the present invention, a thin-film forming method selected from chemical vapor deposition, vapor deposition, ion plating and sputtering is preferable. However, there is no particular limitation to these methods, and a gas evaporation method also can be used.

An example of an electrochemical element using the composite electrode material of the present invention is a lithium secondary battery that includes a negative electrode, a positive electrode and a nonaqueous electrolyte, with the negative electrode and the positive electrode being separated by a separator or a solid electrolyte. The negative electrode can be formed by mixing a conductivity auxiliary agent and a binding agent in the composite electrode material of the present invention and molding the obtained mixture or applying it to a base such as a metal foil using a suitable means.

The conductivity auxiliary agent is not limited specifically as long as it is an electron conducting material. Usually, it is possible to use one electrically conductive material or a mixture of electrically conductive materials selected from natural graphite (flaky graphite, scale-like graphite, amorphous graphite and the like), artificial graphite, carbon black, acetylene black, Ketjen Black (Trademark), carbon fiber, metal powder (copper powder, nickel powder, aluminum powder, silver powder and the like), metal fiber, electrically conductive ceramics, and the polyphenylene derivative described in JP 59(1984)-20971 A.

The binding agent usually can be polysaccharide, thermoplastic resin or polymer having a rubber elasticity, or modified substance thereof, for example starch, polyvinyl alcohol, carboxymethyl cellulose, hydroxypropyl cellulose, regenerated cellulose, diacetyl cellulose, polyvinylchloride, polyvinylpyrrolidone, polytetrafluoroethylene (PTFE), polyvinylidene fluoride, polyethylene, polypropylene, ethylene-propylene-diene terpolymer (EPDM), sulfonated EPDM, styrene-butadiene rubber, butadiene rubber, polybutadiene, fluororubber or polyethylene oxide.

The positive electrode material can be an oxide, a composite oxide, a composite sulfide or a composite sulfate of a transition metal such as titanium, molybdenum, tungsten, niobium, vanadium, manganese, iron, chromium, nickel and cobalt. For example, the positive electrode material preferably is a layered oxide having R3m as a space group expressed by a general formula $Li_{1-x}MO_2$ (wherein M is a transition metal, $0<x<1$), for example, $LiCoO_2$ or an oxide with a spinel structure having Fd3m as a space group expressed by a general formula $LiM_2O_4$ (wherein M is a transition metal, 0<x<1), for example, $Li_{1-x}Mn_2O_4$.

As the nonaqueous electrolyte, a nonaqueous electrolytic solution obtained by dissolving an electrolyte selected from $LiCF_3SO_3$, $LiClO_4$, $LiPF_6$, $LiBF_4$ and $LiC_4F_9SO_3$ in one organic solvent or a mixed solvent of two or more organic solvents selected from 1,2-dimethoxyethane, 1,2-diethoxyethane, propylene carbonate, ethylene carbonate, γ-butyrolactone, tetrahydrofuran, 1,3-dioxolane, diethyl carbonate and methyl ethyl carbonate, or a polymer gel electrolyte obtained by a gelation of the above nonaqueous electrolytic solution by a polymer may be used, for example. These are selected according to characteristics required for a lithium secondary battery and the intended application thereof.

The separator may be, for example, nonwoven fabric or a microporous film. The nonwoven fabric may be made of polypropylene, polyethylene, polyethylene terephthalate or polybutylene terephthalate. The microporous film may be made of polypropylene, polyethylene or ethylene-propylene copolymer.

The solid electrolyte may be $60LiI-40Al_2O_3$, $Li_3N$, $5LiI-4Li_2S-2P_2S_5$, $Li_3N$—LiI, $Li_3PO_4$, $Li_4SiO_4$ and $xLi_3PO_4$-(1-x)$Li_4SiO_4$ (0<x<1).

Next, various embodiments of the present invention will be described by way of examples. However, it should be noted that the present invention is not limited to these examples.

EXAMPLE 1

$Li_3N$ and Co were mixed in a mole ratio of 2:1, and this mixture was put in a copper crucible and burned in an atmosphere of a nitrogen gas at 700° C. for 6 hours, thus obtaining a lithium transition metal composite nitride ($Li_{2.6}Co_{0.4}N$) powder having a particle diameter of about 5 mm. Carbon was made to adhere to the surface of the obtained powder by chemical vapor deposition, thus obtaining a composite electrode material of the present invention. In the chemical vapor deposition of carbon, the lithium transition metal composite nitride ($Li_{2.6}Co_{0.4}N$) powder was heated to about 700° C. in a boiling bed reactor, a nitrogen gas that had been saturated with benzene at 25° C. was brought into contact with this powder, thus performing a chemical vapor deposition treatment at that temperature for 180 minutes. The surface of the resultant composite electrode material was provided with a carbon coating having a thickness of about 0.1 mm.

EXAMPLE 2

By vapor deposition, carbon was made to adhere to the surface of a lithium transition metal composite nitride powder that had been obtained by the same method as that used in Example 1, thus obtaining a composite electrode material of the present invention. In the vapor deposition of carbon, a carbon rod with a sharpened tip and a regular carbon rod were brought into contact with each other and an electric current was passed between them (a pseudo arc discharge) so as to heat carbon to a high temperature and evaporate it. The lithium transition metal composite nitride was mounted to a rotating plate, thus performing a vapor deposition uniformly on the surface of the particles. The degree of vacuum during the vapor deposition was $1.\times10^{-2}$ to $1.3\times10^{-3}$ Pa. The surface of the resultant composite electrode material was provided with a carbon coating having a thickness of about 0.2 mm.

EXAMPLE 3

Lithium transition metal composite nitride powder that had been obtained by the same method as that used in Example 1 was mounted to a rotating plate, and Al was made to adhere uniformly to the surface thereof by ion plating, thus obtaining a composite electrode material of the present invention. The ion plating was performed at a treating temperature of 300° C. and at a bias application voltage of −60 V. The surface of the resultant composite electrode material was provided with an Al coating having a thickness of about 0.2 μm.

EXAMPLE 4

By the same method as that used in Example 3 except for adhering Sn instead of Al, a composite electrode material of the present invention was obtained. The surface of the resultant composite electrode material was provided with a Sn coating having a thickness of about 0.3 μm.

EXAMPLE 5

By the same method as that used in Example 3 except for adhering SiO instead of Al, a composite electrode material of the present invention was obtained. The surface of the resultant composite electrode material was provided with a SiO coating having a thickness of about 0.1 μm.

EXAMPLE 6

By the same method as that used in Example 3 except for adhering $Cu_3N$ instead of Al, a composite electrode material of the present invention was obtained. The surface of the resultant composite electrode material was provided with a $Cu_3N$ coating having a thickness of about 0.1 μm.

EXAMPLE 7

By sputtering, carbon was made to adhere to the surface of a lithium transition metal composite nitride powder that had been obtained by the same method as that used in Example 1, thus obtaining a composite electrode material of the present invention. The sputtering was carried out in an atmosphere of an Ar gas at a degree of vacuum of 1.3 Pa. The surface of the resultant composite electrode material was provided with a carbon coating having a thickness of about 0.2 μm.

EXAMPLE 8

By sputtering, $0.6Li_3PO_4$-$0.4Li_4SiO_4$ was made to adhere to the surface of a lithium transition metal composite nitride powder that had been obtained by the same method as that used in Example 1, thus obtaining a composite electrode material of the present invention. The sputtering was carried out in an atmosphere of Ar gas at a degree of vacuum of 1.3 Pa. The surface of the resultant composite electrode material was provided with a $0.6Li_3PO_4$-$0.4Li_4SiO_4$ coating having a thickness of about 0.2 μm.

COMPARATIVE EXAMPLE 1

An electrode material formed of lithium transition metal composite nitride powder was obtained by the same method as that used in Example 1. However, no coating treatment as in Example 1 was performed on the surface of the obtained lithium transition metal composite nitride.

COMPARATIVE EXAMPLE 2

By the same method as that used in Example 1, lithium transition metal composite nitride ($Li_{2.6}Cu_{0.4}N$) powder having a particle diameter of about 12 $\mu$m was obtained. The obtained powder and mesophase pitch powder were mixed, and the mesophase pitch powder was made to adhere to the surface of the lithium transition metal composite nitride by a mechanofusion technique, which was performed at a rotation speed of 150 rpm with a mixing time of 5 hours. Then, after the resultant article was burned at about 300° C. so as to make the mesophase pitch portion resistant to melt by heat, it was cracked and then burned further at 800° C., thus obtaining an electrode material. The surface of the resultant electrode material was provided with a carbon coating that was as thick as about 4 $\mu$m and was not uniform.

Next, the stabilities in the air of the composite electrode materials of Examples 1 to 8 obtained as described above and the electrode materials of Comparative examples 1 and 2 were evaluated. The evaluations were made by allowing the electrode materials to stand in the air at a temperature of 25° C. and at a humidity of 60% and measuring an elapsed time from when the electrode materials were first exposed to the air until any change in an X-ray diffraction profile occurred. FIG. 1 shows an X-ray diffraction profile of the electrode material of Comparative example 1 before it was allowed to stand, and FIG. 2 shows an X-ray diffraction profile of the same electrode material of Comparative example 1 one hour after it was first exposed to the air.

In other words, by comparing the X-ray diffraction profile of each of the electrode materials before it was allowed to stand as shown in FIG. 1 and that a certain time after it was first exposed to the air, and measuring the time until a peak of a decomposition product such as LiOH shown in FIG. 2 or $Li_2CO_3$ appeared, the stability in the air was evaluated.

The measurement was conducted every 0.5 hour until the 10th hour and, thereafter, every 10 hours until the 100th hour. The results of the measurement are shown in Table 1. "No change" indicates the case where the X-ray diffraction profile did not change even after 100 hours.

TABLE 1

|  | Stability in the air (hour) |
| --- | --- |
| Example 1 | No change |
| Example 2 | No change |
| Example 3 | 90 |
| Example 4 | 90 |
| Example 5 | 80 |
| Example 6 | 80 |
| Example 7 | No change |
| Example 8 | 80 |
| Comparative example 1 | 0.5 |
| Comparative example 2 | 1 |

As becomes evident from Table 1, the stability in the air of the electrode material of Comparative example 1 was extremely low, while the stabilities in the air of the composite electrode materials of Examples 1 to 8 coated with the material capable of occluding/discharging a lithium ion or the lithium-ion-conducting material by a vapor phase method were high. In particular, the stabilities in the air of the composite electrode materials of Examples 1, 2 and 7, which were coated with carbon, were the highest. Further, the electrode material of Comparative example 2, in which carbon coating was carried out by a mechanical method, had a higher stability in the air than that of Comparative example 1, but a lower stability than the composite electrode materials of the present invention.

Next, the above-mentioned electrode materials were allowed to stand in the air at a temperature of 25° C. and at a humidity of 60% for one hour, and lithium secondary batteries were produced experimentally using these materials.

First, a negative electrode mixture, prepared by mixing 10 mg of the above-described electrode material after it had been left standing as a negative electrode material, 9 mg of artificial graphite as a conductivity auxiliary agent and 1 mg of PTFE as a binding agent, was press-molded in a die into a 10-mm-diameter disc shape with a pressure of 98 MPa, thereby producing a negative electrode. Also, a positive electrode mixture, prepared by mixing 67 mg of lithium cobaltate ($LiCoO_2$) as a positive electrode material, 3.7 mg of acetylene black as a conductivity auxiliary agent and 3.7 mg of PTFE as a binding agent, was press-molded in a die into a 10-mm-diameter disc shape with a pressure of 98 MPa, thereby producing a positive electrode. By arranging a separator made of polyethylene between the positive electrode and the negative electrode and using a nonaqueous electrolyte prepared by dissolving 1.2 mol/$dm^3$ of $LiPF_6$ in a 1:2 (volume ratio) mixed solvent of ethylene carbonate and methylethyl carbonate, a coin-type lithium secondary battery having a diameter of 20 mm and a thickness of 1.6 mm was produced. Each of the produced batteries was examined for its charge-discharge characteristics at a current value of 0.5 mA/$cm^2$ at room temperature in a voltage range of 0.01 to 1.4 V. The result showed that the batteries using the composite electrode materials of Examples 1 to 8 of the present invention all had a high initial discharge capacity of about 1000 mAh/g. All of them maintained at least 90% of the initial discharge capacity even after 30 cycles and had excellent cycle characteristics.

On the other hand, the battery of Comparative example 1 was barely able to discharge, and the battery of Comparative example 2 had a low discharge capacity of 610 mAb/g and its discharge capacity after 30 cycles deteriorated to 65% of the initial discharge capacity.

INDUSTRIAL APPLICABILITY

Thus, the present invention makes it possible to provide a composite electrode material with improved stability in the air as an electrode material capable of constituting an electrochemical element having a large capacity and improved cycle characteristics.

What is claimed is:

1. A composite electrode material, comprising:
    a particle of a lithium transition metal composite nitride having a particle diameter of 0.01 to 30 $\mu$m; and
    one material selected from a material capable of occluding/discharging a lithium ion and a lithium-ion-conducting material (other than the lithium transition metal composite nitride), wherein the one material adheres to a surface of the particle of the lithium transition metal composite nitride by a vapor phase method.

2. The composite electrode material according to claim 1, wherein the vapor phase method is a thin-film forming method selected from the group consisting of chemical vapor deposition, vapor deposition, ion plating and sputtering.

3. The composite electrode material according to claim 1, wherein the one material has a thickness of 1 nm to 2 $\mu$m.

4. The composite electrode material according to claim 1, wherein a transition metal element constituting the lithium transition metal composite nitride is at least one element selected from the group consisting of Co, Cu, Fe and Ni.

5. The composite electrode material according to claim 1, wherein the material capable of occluding/discharging the lithium ion is carbon.

6. The composite electrode material according to claim 1, wherein the material capable of occluding/discharging the lithium ion is at least one selected from the group consisting of Mg, Ca, Al, Si, Ge, Sn, Sb, Bi, Ga, In and Zn, an oxide thereof and a nitride thereof.

7. The composite electrode material according to claim 1, wherein the material capable of occluding/discharging the lithium ion is one selected from the group consisting of an oxide and a nitride of at least one selected from the group consisting of Ti, V, Cr, Mn, Fe, Co, Ni, Cu, Nb and Mo.

8. The composite electrode material according to claim 1, wherein the lithium-ion-conducting material is at least one selected from the group consisting of $Li_3PO_4$, $Li_4SiO_4$ and $xLi_3PO_4$-$(1-x)Li_4SiO_4$ ($0<x<1$).

9. A method for manufacturing a composite electrode material, comprising:
making one material selected from a material capable of occluding/discharging a lithium ion and a lithium-ion-conducting material (other than a lithium transition metal composite nitride) adhere to a surface of a particle of a lithium transition metal composite nitride having a particle diameter of 0.01 to 30 μm by a vapor phase method.

10. The method for manufacturing a composite electrode material according to claim 9, wherein the vapor phase method is a thin-film forming method selected from the group consisting of chemical vapor deposition, vapor deposition, ion plating and sputtering.

11. An electrochemical element, comprising:
a positive electrode;
a negative electrode; and
a nonaqueous electrolyte;
wherein at least one of the positive electrode and the negative electrode comprises a composite electrode material comprising a particle of a lithium transition metal composite nitride having a particle diameter of 0.01 to 30 μm and one material selected from a material capable of occluding/discharging a lithium ion and a lithium-ion-conducting material (other than the lithium transition metal composite nitride), which is made to adhere to a surface of the particle of the lithium transition metal composite nitride by a vapor phase method.

12. The electrochemical element according to claim 11, wherein the composite electrode material is contained only in the negative electrode.

13. The electrochemical element according to claim 11, wherein the vapor phase method is a thin-film forming method selected from the group consisting of chemical vapor deposition, vapor deposition, ion plating and sputtering.

14. The electrochemical element according to claim 11, wherein the one material has a thickness of 1 nm to 2 μm.

15. The electrochemical element according to claim 11, wherein a transition metal element constituting the lithium transition metal composite nitride is at least one element selected from the group consisting of Co, Cu, Fe and Ni.

16. The electrochemical element according to claim 11, wherein the material capable of occluding/discharging the lithium ion is carbon.

* * * * *

UNITED STATES PATENT AND TRADEMARK OFFICE
CERTIFICATE OF CORRECTION

PATENT NO. : 6,989,218 B2
DATED : January 24, 2006
INVENTOR(S) : Masayuki Yamada et al.

It is certified that error appears in the above-identified patent and that said Letters Patent is hereby corrected as shown below:

Title page,
Item [56], References Cited, OTHER PUBLICATIONS, replace
"M. Nishijima et al.; "Synthesis and electrochemical studies of a new anode material, $Li_{3-x}Co_xN$," Solid State Ionics, vol. 83, pp. 107-111 (1990), (month unknown)." with
-- M. Nishijima et al.; "Synthesis and electrochemical studies of a new anode material, $Li_{3-x}Co_xN$," Solid State Ionics, vol. 83, pp. 107-111 (1996), (month unknown). --.

Signed and Sealed this

Twenty-third Day of May, 2006

JON W. DUDAS
*Director of the United States Patent and Trademark Office*